Patented June 2, 1936

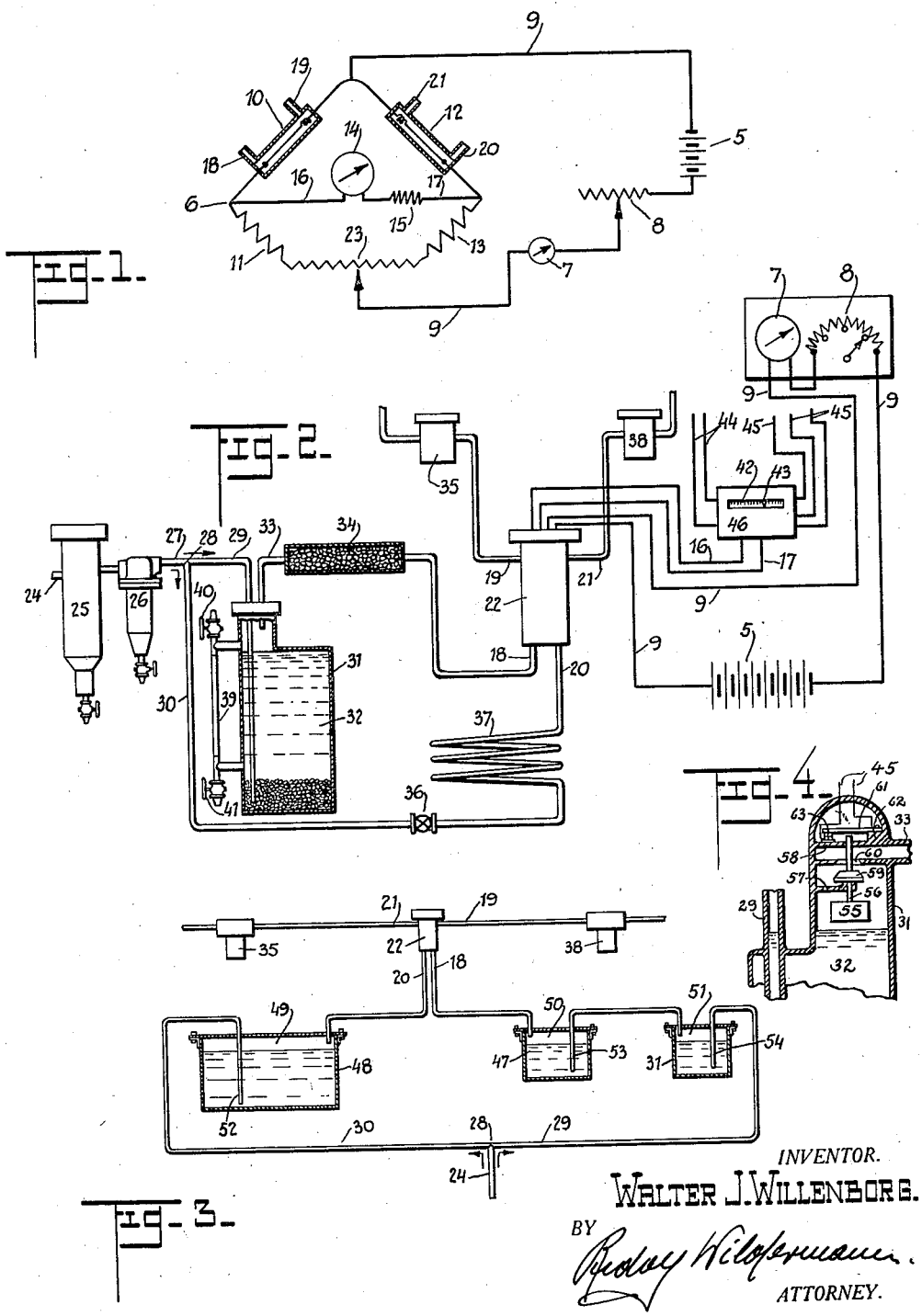

2,042,646

UNITED STATES PATENT OFFICE 2,042,646

METHOD OF AND MEANS FOR ANALYZING GASES BY DIFFERENTIAL THERMAL CONDUCTIVITY MEASUREMENTS

Walter J. Willenborg, Weehawken, N. J., assignor to United States Fire Protection Corporation, Hoboken, N. J., a corporation of Delaware Application November 20, 1930, Serial No. 497,000

7 Claims. (Cl. 23—255)

My invention concerns a method of and means for analyzing gas mixtures by differentially measuring their thermal conductivity.

In a prior application for Letters Patent, Serial No. 420,613, filed January 13th, 1930, entitled Protecting combustibles, I have discussed a method of measuring the quality of a mixture of gases containing combustibles from a point of view of safety by measuring their thermal conductivity in relation to a predetermined standard.

My present method and means aim at determining by a double-sampling thermal conductivity cell the quantity of a particular ingredient contained in said mixture so that, from such a determination, the proportion of other ingredients in said mixture may be deduced.

My method enables me to measure a particular constituent in a mixture of three or more gases, each having a different thermal conductivity,—regardless of the quantities of the other gases, and substantially regardless even in respect to whatever the other constituents may be.

One of the objects of my invention is quantitatively to analyze a mixture of gases in respect to one of the ingredients by taking a sample of said mixture and simultaneously passing like parts of said sample through the two cells of a double sampling thermal conductivity cell, said two parts differing from each other in respect to said ingredient which is quantitatively to be determined. The difference in thermal conductivity of the two parts of the sample is then due only to the difference of said parts in respect to said ingredient; measurement of the difference of thermal conductivity between said parts yields information in respect to the proportionate quantity of said ingredient; this in turn allows inference in respect to other ingredients, which are contained in said sample in a known ratio to said one of said ingredients.

Another object of my invention is continuously to sample a gas mixture in the manner described above, so that at all times the proportion in which a certain ingredient is present in a changing mixture, may be observed regardless of the general qualities of said mixture.

A further object of my invention is to have a meter by means of which the quality of a mixture, in respect to a certain ingredient, is substantially presently, and continuously registered for the purpose of automatically controlling the manner in which the general composition of said mixture is varied.

Another object of my invention is to co-ordinate the flow of treated and untreated samples of the mixture of the gas to and through a double by-pass thermal conductivity cell in such a manner that the differential measurements in said cell show the quality of said mixture at a particular time.

A further object of my invention is to provide for the comparison of a gas to be tested, to a heterogeneous gas mixture, by providing a constant and continuous flow of new gas of such a mixture into a comparison cell. Heretofore, it was difficult to use such a heterogeneous gas as a comparison gas in thermal conductivity cells, because, when at rest in a sealed cell, such a gas will have a tendency to be segregated into layers of gases of different specific gravities; the thermal conductivity of a cell will be upset by such separation of the ingredients, inasmuch as the resistance of the electric wire passing through such a cell will not be affected by the thermal conductivity of the separated gases in the same manner as if the gases were uniformly mixed. On the other hand, even if the heterogeneous contents of a standard cell are circulated, by means especially provided for that purpose, they will separate into layers during period of rest; and it will take an uncertain period of time of operation completely to mix those gases again.

In order to obtain these and other objects of my invention, I employ the method and means described in the following, my improved means being better understood by the illustrations of the accompanying drawing, in which:—

Fig. 1 shows, diagrammatically, the electric lay-out of the thermal conductivity cell.

Fig. 2 shows, diagrammatically, the lay-out for the apparatus when a particular ingredient is removed from part of a continuously supplied sample.

Fig. 3 shows, schematically, the means employed to facilitate simultaneous differential measurements.

Fig. 4 shows the sectional, sectioned side view of protective means, which may form part of the jar or container, wherein one or the other of the ingredients of the gas is removed.

In the diagram of Fig. 1, the battery 5 is used to supply substantially uniform electric current to the Wheatstone bridge 6. The current supplied by the battery to the bridge may be checked by the meter 7 and may be regulated by the rheostat 8. In the bridge the circuit 9 of the current is divided into two legs, which comprise, respectively, one of the two sets of thermal conductivity cells and rheostats, 10 and 11, and 12 and 13. The circuit 9 is connected to the bridge between the ratio arms or rheostats 11 and 13 through a slide wire resistor 23, which permits the balancing of the two legs 10, 11 and 12, 13 of the bridge. Across the bridge I connect the galvanometer 14 and the fixed resistance 15, connecting conductors 16 and 17 being connected to the two legs of the bridge between the respective thermal conductivity cells and rheostats 10, 11 and 12, 13, respectively. The sample gases are introduced into the thermal conductivity cells 10 and 12 through the inlets 18 and 20, and they issue from said cells, after measurements have been performed through the outlets 19 and 21, respectively.

At the present state of the art, accurate means are known which serve to reduce the thermal conductivity cells and the gases passing therefrom to substantially the same temperature; means which thus serve to balance the temperatures of the cells are indicated in Figs. 2 and 3 by the casings 22, in which the thermal conductivity cells 10 and 12 are enclosed, in which the gases flowing through said cells are reduced to like temperatures and which also serve to protect the other parts of the legs of the Wheatstone bridge, i. e., the rheostats 11, 13 and 23.

As long as the samples, which are simultaneously introduced in the cells 10 and 12, are of like thermal conductivity, the galvanometer 14 does not register any currents, because the two legs of the bridge remain balanced, although the current in the circuit 9 may vary since the thermal conductivity of different sets of like samples introduced at various times into the two cells may vary. When there is a variance in the thermal conductivity of samples, which are simultaneously introduced into the two cells 10 and 12, a current will flow through the conductor 16, the galvanometer 14, the rheostat 15 and the conductor 17, the current registered by the galvanometer 14 being predeterminedly related to the difference between the thermal conductivities of the two samples of gas passing through the cells 10 and 12. Thus the reactions of the cells are directly related to each other by electrical registering means, e. g., the galvanometer.

In my above-referred-to patent application, I showed the use of a thermal electric cell for the determination of carbon dioxide. The mixture of gases leaving the exhaust of an internal combustion engine is washed for the purpose of preparing a so-called inert gas. Such a washed inert gas contains an appreciable quantity of only one ingredient, the thermal conductivity of which substantially deviates from that of the air. That is carbon dioxide. When the thermal conductivity of such a washed exhaust mixture is therefore compared with that of air, the variance is directly related to the quantity of carbon dioxide contained therein and the thermal conductivity method may therefore be used to determine the quantity of carbon dioxide in such a gas. When such an inert gas is introduced into the space above a combustible, for instance above gasoline, in order to prevent its inflammation, the vapors and gases given off by the gasoline mix with the inert gas introduced, directly, or are mixed therewith, when the inert gas mixes with the gasoline-vapor-saturated atmosphere above the gasoline. Now it is not necessary, nor economical, to replace the entire atmosphere in a container above the gasoline by inert gas, but it is satisfactory, for all practical purposes of safety, to mix the inert gas in a certain proportion with the atmosphere contained in a container above the gasoline.

After the inert gas has been mixed with such an atmosphere containing gasoline vapors, or after the inert gas has been mixed with gasoline vapors, the thermal conductivity of which is greatly different from that of air, I cannot use the above described thermal conductivity method in order to determine the carbon dioxide contents of the mixture, since it now contains two variables with thermal conductivities greatly different from that of air if the carbon dioxide contents could now be quantitatively determined, I could readily ascertain whether a satisfactory amount of inert gas has been introduced or is present in the atmosphere above the gasoline, because the quantity of inert gas is definitely related to the quantity of carbon dioxide present, or that relation can readily be determined before the inert gas is introduced in the gasoline containers. Determining the quantity of inert gas in such a gas mixture which contains gasoline vapors, is one example of an instance where my novel method of differentially determining the quality of a gas is readily applicable. I take a sample of such a gas mixture and remove the carbon dioxide from part of it. Then I introduce the treated part (without carbon dioxide) and the untreated part (with carbon dioxide) of the gas into cells 10 and 12, respectively, at one and the same time. The difference between thermal conductivities of the parts in the two cells is registered by the galvanometer 14, and its reading permits a deduction in respect of the carbon dioxide contents of the gas which has been sampled, or the galvanometer 14 may be calibrated so that it indicates the carbon dioxide percentage directly. Having determined the carbon dioxide contents of the mixture, the observer knows the proportionate inert gas contents and therefore knows to what extent the sample of the mixture has been made safe by the introduction of the inert gas.

Let us assume that the user, either by experience, or by measurement, knows that the inert gas which he supplies to the space above gasoline in a tank contains 14% $CO_2$; and that the parts of the sample of the mixture of gas taken from the space above the gasoline and simultaneously introduced into the cells 10 and 12 would cause the indication of 7% of carbon dioxide on the galvanometer 14. That reading permits the inference that the atmosphere above the gasoline, regardless of the presence of gasoline vapors in said atmosphere, contains 50% of the inert gas introduced.

Fig. 2 shows, how an analysis of this kind can be carried on continuously: A sample of the mixture to be analyzed is introduced through the inlet 24 into a dryer 25 under substantially uniform pressure. After having been dried, the sample is carried through the filter 26 into a conduit 27 which is bifurcated at 28, so that substantially half of the gas enters conduit 29, the other half entering conduit 30. The conduit 29 extends into a container 31 which is filled with a potassium hydroxide solution 32. The carbon dioxide is removed from the gas issuing from the end of conduit 29, while said gas bubbles through the KOH solution; and the gas, from which the carbon dioxide has thus been removed, is carried through an outlet on top of container 31 by means of a conduit 33 through a dryer 34 to the inlet 18 of one of the thermal conductivity cells contained in the casing 22. From the outlet 19 of said cell, the gas passes through flow gage 35 into the atmosphere.

The part of the sample of the gas mixture which flows through the conduit 30, passes a needle valve 36. That valve serves to reduce the speed of flow of gas in said conduit to that of the gas in conduit 29; from that valve the gas passes into conduit convolutions 37, valve 36 and/or coil 37 serve as pressure reducing means, and from there through the inlet 20 into the cell 12 in the casing 22. The thermal conductivity of the gas influences the current in the leg of the Wheatstone bridge, which extends through said cell; whereupon the gas passes from the outlet 21 of said cell through the flow gage 38 and is then released into the atmosphere. The flow gages 35 and 38 advise the operator about the speed at which the gases flow through the two cells, and he coordinates those speeds by manipulation of valve 36. The valve 36 is adjusted to place into the branch 30 substantially the same obstruction of flow which is caused in the branch 29 by the liquid 32 and the dryer 34. The flow gages 35 and 38 also guide the operator in regulating the speed of admission of samples through conduit 24.

The container 31 is provided with a level gage 39 which permits a check upon the liquid contents of said container. Through the valves 40 and 41 additional liquid may be introduced from an independent source, or some of the liquid in said container may be drained therefrom, so that the observed contents of the KOH solution in the container 31 may be kept substantially constant, and so that said solution may be replaced, without changing its level in the container 31. The volume of gas above the liquid 32 in the container 31 and the volume of gas between said container and the cell 10 remains therefore substantially constant. The convolutions 37 in the conduit 30 are made of such capacity, that the gas contained in this branch between the point of bifurcation 28 and the cell 12 is definitely proportioned, or equal to the quantity of gas accommodated between said point of bifurcation and cell 10 in the branch conduit 29 and the communicating containers.

If the quantities of carbon dioxide removed by the KOH solution are substantially small, the gas volumes in the two branches between the bifurcation point 28 and the cells may be made substantially equal, so that corresponding parts of samples will reach cells 10 and 12 simultaneously. If the quantities of the gas removed by the KOH solution are comparatively large, the gas volume provided for in the branch 29 is made correspondingly smaller than the capacity of the branch 30, so that parts of the gas, which have been simultaneously branched off at point 28 of bifurcation, reach the respective cells 10 and 12 at the same time. If the carbon dioxide contents of a mixture are known to fluctuate within a certain range, the difference between the volume provided for in the two branches is chosen to correspond to the average value of carbon dioxide absorbed by the KOH solution, or the level of the KOH solution in container 31 is raised in proportion to the fluctuations of carbon dioxide contents by correspondingly introducing new liquid or removing some of the liquid through the valves 40 and 41 respectively.

The cells 10 and 12 contained in the casing 22 are wired according to the diagram of Fig. 1, corresponding parts in Fig. 2, as well as throughout the drawings, being provided with corresponding numerals. The galvanometer 14 is shown in the instance of Fig. 2 to be replaced by an instrument 36 which is provided with a large scale 42 over which travels a point 43. In the manner indicated in my prior application, this pointer may be used, directly or indirectly, to actuate relays or switches, which in turn control the flow of gases into or away from the gas mixture which has been sampled, so that the qualitative defects of said mixture, as shown by registrations of the instrument, are corrected. Current supplying conduits 44 are shown to lead for that purpose to the instrument 46 whereas the wires 45 lead away from said instrument to the various relay operated valves, as illustrated in my prior application.

Instead of regulating the gas pressures by a valve 36 and by the flow gages 35 and 38, the parts of the sample of the gas introduced at 24 and branching off at the bifurcation point 28 may be carried to or through other means compensating their volumes and pressures, as required in order simultaneously to introduce corresponding gas parts into the cells contained in casing 22. Their size and shape will largely be controlled by the chemical operation resorted to for removing the ingredient, the quantity of which is to be differentially determined. Whereas in the device of Fig. 2, the gases are dried before they are introduced into the thermal conductivity cells, they retain their humidity when passing through the device of Fig. 3 and the humidity is balanced by passing them through correspondingly designed fluid traps. These traps serve at the same time to bring about a thorough mixing of the gases before they enter upon the respective cells.

The branch 29 contains, in the device of Fig. 3, a container 31, in which the ingredient which is to be quantitatively determined is removed from part of the gas sample. The volumetric contents of the branches 29 and 30 are shown to be substantially equally proportioned; the containers 47 and 48 contain water, through which the parts of the samples of the gas mixture bubble before they reach the cells; the space 49 above the liquid in container 48 is substantially equal to the sum of the spaces 50 and 51 above the liquids in the containers 47 and 31 respectively. The pipes 52, 53 and 54, from the ends of which the gas bubbles through the liquids in the respective containers are also arranged to extend below the surface of the respective liquids to such a distance as to subject the respective gases to similar pressure heads. In other words, the distance, to which the pipes 52 extend below the liquid in container 48, is substantially equal to the sum of the distances to which the pipes 53 and 54 extend below the level of the liquids in the containers 47 and 31, respectively. Thus the pressures and volumes of the parts of the sample of the gas mixtures are controlled in such a manner, that corresponding parts of the sample simultaneously reach and pass through the respective cells.

The delicacy of thermal conductivity cells recommends special precaution in respect to the entry of foreign matter into such cells. Care must therefore be taken to prevent the chemicals, which are used for removing one of the ingredients from the gas mixture, from entering upon such cells. When, for instance, a liquid is used in order to remove one of the ingredients, and the volume of said liquid increases while it absorbs or dissolves such an ingredient, and the operator is careless, there is danger that the liquid enters upon the cell.

Fig. 4 shows means used in connection with such a liquid container for the purpose of protecting the cells. It is shown in such manner that it may be substituted for the upper part of the jar or container 31 shown in Fig. 2.

Above the level of the liquid 32 there is arranged a float 55. This float is fastened to the lower end of a rod 56, which is vertically slidably supported in a bracket 57 and in a horizontal partition 58 near the top of the container. The rod 56 carries a valve 59 which is pressed into the opening 60, when the rising liquid 32 buoys the float 55 upwardly. When the valve 59 thus closes the opening 60, the gas, which has entered upon the jar through the conduit 29 is prevented from passing through conduit 33 to the cell 10. This also applies to the liquid 32. The operation of the apparatus is thereby interrupted, and to prevent the delivery of untested gas from the gas supply to which the conduit 24 is connected, and also to call the attention of the operator to his neglect of allowing the liquid in container 31 to rise too far, I include an electric device in the jar, which is accommodated in the top of said jar above the partition 58. That electrical device comprises a tensile contact lever 61, which is insulatedly mounted upon a lug 62, and which normally rests upon an insulatedly arranged contact point 63. When the rod 56 is raised by the float 55, it engages upon the lower side of contact lever 61 and breaks the contact between said lever and point 63. The contact lever 61 and point 63 are connected in series in the circuit 45, which controls solenoid valves on the gas supply, as referred to above. The regular function of the gas supply is thereby interrupted, and alarm means may be included in the circuit 45, to call the operator's attention to the trouble.

The use of my device for the purpose of testing a mixture of air, gasoline vapors and inert gas has been described above, as a complex example, but my device may also be used to permit a more accurate and more reliable test of gases which heretofore have already been analyzed by the thermal conducitvity method. Thus the thermal conductivity method has been used heretofore in order to determine the quality of gases produced by an inert gas producer. Reference to such analysis was had in my above referred to patent application. The gas tested in such an instance is the inert gas, which is exhausted by an internal combustion engine. When the carburetion of such an exhaust gas is satisfactory, the carbon dioxide contained therein is the ingredient which predominantly changes the thermal conductivity of such an exhaust gas as compared with air. The thermal conductivity method, as applied heretofore to such exhaust gases, is based on that principle. But when the carburetion of an internal combustion engine is very poor, the hydrogen contents of the exhaust, which are comparatively small during good carburetion, may rise to seven or more percent. The thermal conductivity of hydrogen greatly deviates from that of air, or from that of most of the ingredients of an exhaust gas. So great a percentage of hydrogen in an exhaust gas may therefore prevent the determination of the carbon dioxide contents of such a mixture by the old thermal conductivity method. In such a case my method proves to be of great value to determine the carbon dioxide, regardless of whatever ingredients there may be in an exhaust. The hydrogen or other ingredients are prevented from appreciably influencing the currents registered by the meter 14, because said meter registers, by comparison, substantially, only the difference of carbon dioxide contents of the two samples passing through the two cells, the carbon dioxide having been removed from the gas passing through one of those cells, those samples otherwise being substantially similar in constitution.

In an equivalent manner my invention may be applied to any natural or artificially produced variable gas mixture, in which an ingredient of distinctive thermal conductivity is to be measured, nunc pro tunc, or where the proportionate quantity of such an ingredient is a fair indicator of the quality of the mixture.

Although I have shown and described the method and means of my invention by one particular example, yet I do not wish to be limited thereby except as the state of the art and the appended claims may require, for it is obvious that various substitutions, modifications and changes may be made, without departing from the spirit and scope of my invention.

What I claim as new is:

1. Means for analyzing a gas mixture, comprising two thermal conductivity cells, electrical means registering the difference of thermal conductivities of gases passing through said cells, conduits delivering samples of said gas mixture from a common source to said cells, chemical treating means forming part of one of said conduits and adapted to remove one only of the ingredients of said mixture from the sample thereof passing through said one conduit, and pressure reducing means on the other one of said conduits coordinating the delivery of gas from said conduit to the delivery of gas from said one first conduit.

2. Means for analyzing a gas mixture, comprising two thermal conductivity cells, electrical registering means directly relating to each other the thermal conductivities of gases passing through said cells, conduits deliverying samples of said gas mixture from a common source to said cells, and chemical treating means forming part of one of said conduits and adapted to withdraw one only of the ingredients of said mixture from the sample thereof passing through said one conduit, the spaces of said conduits, through which the gas samples pass to said cells, being substantially equal, so that samples simultaneously withdrawn from said common source, substantially simultaneously pass through said cells.

3. Means for analyzing a gas mixture comprising two thermal conductivity cells in one Wheatstone bridge circuit, a container for said mixture, branch conduits each connected at one end with said container and at the other end with one of said cells, and chemical treating means forming part of one of said conduits and withdrawing from the part of said mixture passing through said conduit one of the ingredients of said mixture, said conduits being dimensioned so that the volumetric capacities of the gas-conducting sections thereof are substantially proportionate to the volume of gases delivered therefrom into said cells, respectively.

4. Means for quantitatively analyzing a gas mixture, the combination of a pair of thermal conductivity cells, and means for electrically comparing with each other and registering the difference of conductivity of the contents of said cells, with means into which samples are simultaneously withdrawn from said mixture and from which they are substantially simultaneously delivered to said cells, and means for chemically absorbing and removing an ingredient from one of said samples before it is delivered to one of said cells, the other ingredients of said one sample remaining the same.

5. Means for analyzing a gas mixture, comprising a pair of thermal conductivity cells connected in parallel into the circuit of a Wheastone bridge, conduits substantially simultaneously introducing gas samples, which are simultaneously taken from said mixture, into said cells, and chemical means interposed in one of said conduits, absorbing and thus removing one of the ingredients of said mixture from the sample passing through said conductor, the other ingredients of the mixture passing through said one conduit remaining the same.

6. In combination with the source of supply of a gas mixture containing $CO_2$, two conduit systems connected with said supply, a thermal conductivity cell in each of said systems, means directly relating to each other the currents passing through said cells, means removing the $CO_2$ only from the gas passing through one of said systems the mixtures delivered to said cells being otherwise unchanged, and means coordinating the delivery of gases from said systems to said cells, so that gases simultaneously withdrawn from said supply are simultaneously delivered to said cells.

7. The method of checking the quality of a gas, comprising continuously sampling said gas, continuously subjecting one of (several) simultaneously taken samples to a predetermined treatment changing its composition, and continuously and directly comparing the thermal conductivities of said changed samples as to one of its ingredients only and a simultaneously taken unchanged sample.

WALTER J. WILLENBORG.

CERTIFICATE OF CORRECTION.

Patent No. 2,042,646.  June 2, 1936.

WALTER J. WILLENBORG.

It is hereby certified that error appears in the printed specification of the above numbered patent requiring correction as follows: Page 5, second column, line 16-17, claim 7, strike out the words "as to one of its ingredients only" and insert the same after "composition" and before the comma in line 14, same claim; and that the said Letters Patent should be read with this correction therein that the same may conform to the record of the case in the Patent Office.

Signed and sealed this 11th day of August, A. D. 1936.

Henry Van Arsdale (Seal)   Acting Commissioner of Patents.